US009698392B2

(12) United States Patent
Yamada et al.

(10) Patent No.: US 9,698,392 B2
(45) Date of Patent: Jul. 4, 2017

(54) ELECTRICITY STORAGE MODULE AND ELECTRICALLY POWERED VEHICLE

(71) Applicant: HONDA MOTOR CO., LTD., Tokyo (JP)

(72) Inventors: Kentaro Yamada, Wako (JP); Koichi Hasegawa, Wako (JP); Tetsu Miyamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/927,469

(22) Filed: Oct. 30, 2015

(65) Prior Publication Data

US 2016/0190526 A1 Jun. 30, 2016

(30) Foreign Application Priority Data

Dec. 25, 2014 (JP) .................................. 2014-261837

(51) Int. Cl.
*H01M 2/10* (2006.01)
*H01M 10/04* (2006.01)
*B60L 11/18* (2006.01)

(52) U.S. Cl.
CPC ....... *H01M 2/1077* (2013.01); *B60L 11/1877* (2013.01); *H01M 2/1083* (2013.01); *H01M 10/0481* (2013.01); *H01M 2220/20* (2013.01)

(58) Field of Classification Search
CPC .......................... H01M 2/1077; H01M 2/1083
See application file for complete search history.

(56) References Cited

U.S. PATENT DOCUMENTS

2011/0206948 A1* 8/2011 Asai .................... H01M 2/0473
429/7
2014/0023906 A1* 1/2014 Hashimoto ......... H01M 2/1077
429/120

FOREIGN PATENT DOCUMENTS

| JP | 2012-256466 | 12/2012 | |
| JP | 2014-044884 | 3/2014 | |
| JP | WO 2014034057 A1 * | 3/2014 | .......... H01M 2/1077 |

OTHER PUBLICATIONS

Japanese Office Action for corresponding JP Application No. 2014-261837, Mar. 21, 2017 (w/ English machine translation).
Japanese Office Action for corresponding JP Application No. 2014-261837, Dec. 20, 2016 (w/ English machine translation).

* cited by examiner

*Primary Examiner* — Gregg Cantelmo
(74) *Attorney, Agent, or Firm* — Mori & Ward, LLP

(57) ABSTRACT

An electricity storage module includes a storage cell group, first and second end plates, a first restraining band, a second restraining band, and at least one intermediate plate. The first restraining band is provided to face a first side surface of the storage cell group and is connected to the first and second end plates to restrain the storage cell group. The first restraining band includes a first flat surface, a first bent portion, and a second bent portion. The second restraining band includes a second flat surface, a third bent portion, and a fourth bent portion. The at least one intermediate plate is disposed at an internal position in the storage cell group in a stacking direction. The first and third bent portions or portions in vicinities of the first and third bent portions are connected to the at least one intermediate plate.

12 Claims, 8 Drawing Sheets

ELECTRICITY STORAGE MODULE AND ELECTRICALLY POWERED VEHICLE

CROSS-REFERENCE TO RELATED APPLICATIONS

The present application claims priority under 35 U.S.C. §119 to Japanese Patent Application No. 2014-261837, filed Dec. 25, 2014, entitled "Electricity Storage Module and Electrically Powered Vehicle Equipped Therewith." The contents of this application are incorporated herein by reference in their entirety.

BACKGROUND

1. Field

The present disclosure relates to an electricity storage module and an electrically powered vehicle.

2. Description of the Related Art

Generally, an electricity storage module that includes a storage cell group (battery module) in which a plurality of storage cells (battery cells) have been stacked is known. Because this electricity storage module is, for example, mounted in electrically powered vehicles, such as hybrid vehicles and electric vehicles (EVs), the output voltage of the electricity storage module is made high by stacking many storage cells.

In an electricity storage module, two end plates are disposed at two ends of the storage cells in the stacking direction of the storage cells and are fastened to two ladder frames that are disposed in the stacking direction along side surfaces the storage cells. This kind of technology employed in a battery module is disclosed in, for example, Japanese Unexamined Patent Application Publication No. 2012-256466.

Such a ladder frame is formed by pressing a metal plate and is provided with a plurality of slits for distribution of cooling air. An upper edge and a lower edge of each ladder frame are provided with an upper flange and a lower flange each of which is formed by bending a corresponding one of the upper and lower edges inwardly in a width direction. An upper surface of the lower flange is provided with plate springs that have a U-shaped sectional shape, corresponding to the individual storage cells.

SUMMARY

According to one aspect of the present invention, an electricity storage module includes a storage cell group, two end plates, two restraining bands, and at least one intermediate plate. A plurality of quadrangular storage cells are stacked in the storage cell group. The two end plates are provided at two opposite ends of the storage cell group in a stacking direction of the storage cells. The two restraining bands extend along mutually parallel side surfaces of the storage cell group and are connected to the two end plates and restrain the storage cell group. Each of the two restraining bands has a flat surface that extends parallel to the side surfaces of the storage cell group and bent portions that are bent from two opposite ends of the flat surface in a short-dimension direction and that extend in such a direction that the bent portions of one of the two restraining bands and the bent portions of the other one of the two restraining bands extend toward each other following shapes of corner portions of the storage cell group. The at least one intermediate plate is disposed at an internal position in the storage cell group in the stacking direction. Of the two restraining bands, the bent portions that extend toward each other or portions near the bent portions are connected to the intermediate plate.

According to another aspect of the present invention, an electrically powered vehicle includes the electricity storage module and a vehicle body frame to which the two restraining bands are fixed via a bracket.

According to further aspect of the present invention, an electricity storage module includes a storage cell group, first and second end plates, a first restraining band, a second restraining band, and at least one intermediate plate. The storage cell group includes quadrangular storage cells stacked in a stacking direction, a first end, a second end opposite to the first end in the stacking direction, first, second, third, and fourth corner portions extending along the stacking direction, a first side surface, and a second side surface. The first side surface is provided between the first and second ends and between the first and second corner portions and extends along the stacking direction. The second side surface is provided between the first and second ends and between the third and fourth corner portions and extends along the stacking direction. The first and second side surfaces face each other. The first and second end plates are provided at the first and second ends of the storage cell group, respectively. The first restraining band is provided to face the first side surface of the storage cell group and is connected to the first and second end plates to restrain the storage cell group. The first restraining band includes a first flat surface, a first bent portion, and a second bent portion. The first flat surface has a first surface end and a second surface end opposite to the first surface end in a short-dimension direction of the first flat surface and faces the first side surface of the storage cell group. The first bent portion is bent from the first surface end of the first flat surface. The second bent portion is bent from the second surface end of the first flat surface. The second restraining band is provided to face the second side surface of the storage cell group and is connected to the first and second end plates to restrain the storage cell group. The second restraining band includes a second flat surface, a third bent portion, and a fourth bent portion. The second flat surface has a third surface end and a fourth surface end opposite to the third surface end in the short-dimension direction and faces the second side surface of the storage cell group. The third bent portion is bent from the third surface end of the second flat surface. The first bent portion of the first restraining band and the third bent portion extend toward each other along a shape of the first corner portion and a shape of the third corner portion of the storage cell group, respectively. The fourth bent portion is bent from the fourth surface end of the second flat surface. The second bent portion of the first restraining band and the fourth bent portion extend toward each other along a shape of the second corner portion and a shape of the fourth corner portion of the storage cell group, respectively. The at least one intermediate plate is disposed at an internal position in the storage cell group in the stacking direction. The first and third bent portions or portions in vicinities of the first and third bent portions are connected to the at least one intermediate plate.

According to the other aspect of the present invention, an electrically powered vehicle includes the electricity storage module and a vehicle body frame to which the first and second restraining bands are fixed via a bracket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
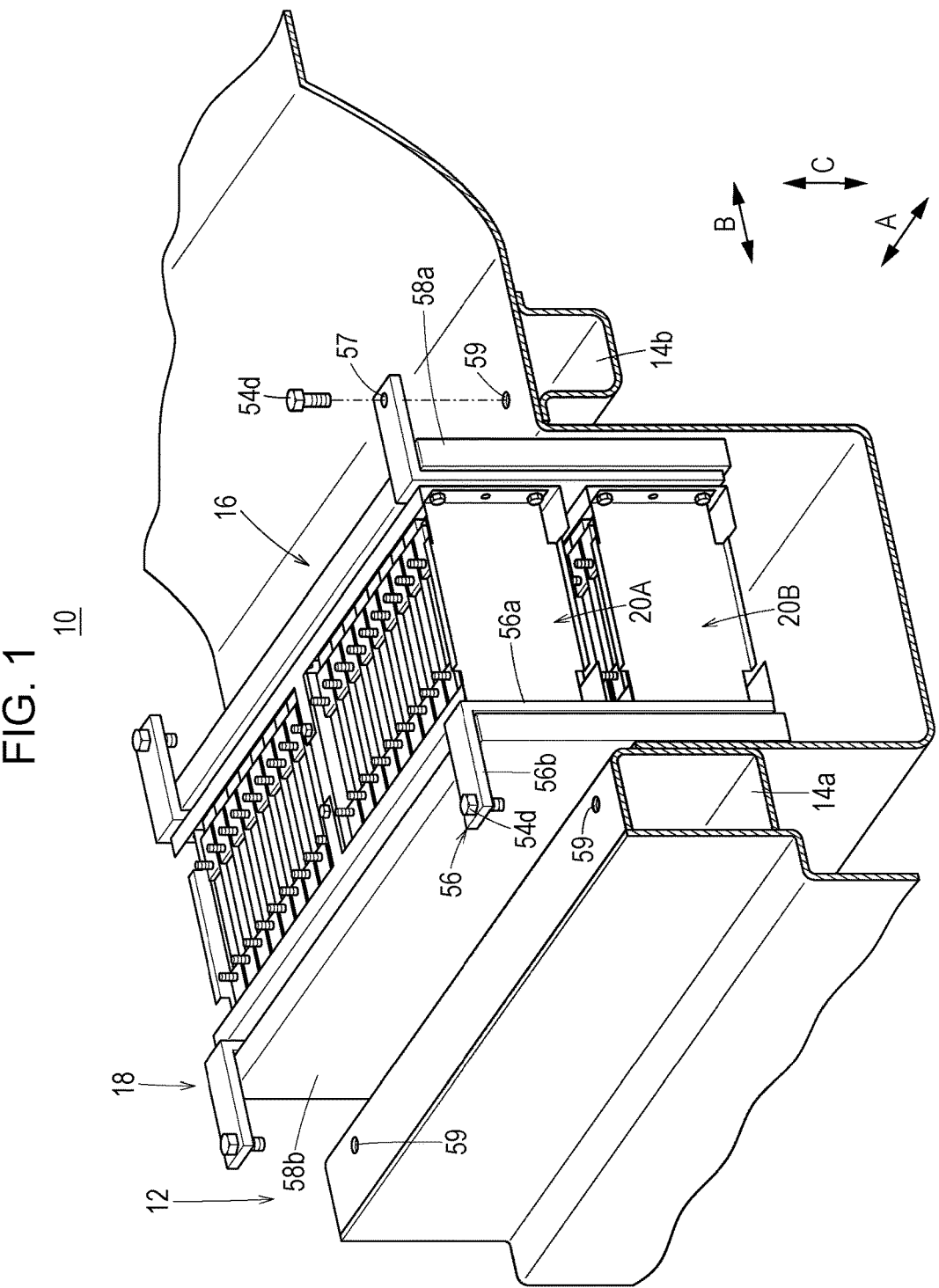
FIG. 1 is a perspective illustrative view of portions of an electrically powered vehicle according to a first embodiment of the present disclosure.

The embodiments will now be described with reference to the accompanying drawings, wherein like reference numerals designate corresponding or identical elements throughout the various drawings.

As shown in FIG. 1, an electrically powered vehicle (e.g., a hybrid vehicle or an electric vehicle (EV)) 10 according to a first embodiment of the present disclosure is driven by a motor (not graphically shown) that is electrically driven. A battery pack 16 is mounted, via a mounting structure 18, on two cross-members 14*a* and 14*b* that constitute a vehicle body frame 12 of the electrically powered vehicle 10.

The battery pack 16 includes a plurality of set of electricity storage modules, for example, two sets thereof, that is, an electricity storage module 20A and an electricity storage module 20B disposed at upper and lower positions. The electricity storage modules 20A and 20B are electrically connected in series. The electricity storage modules 20A and 20B are constructed in the same manner. Therefore, only the electricity storage module 20A is described in detail below, and the same component elements are denoted by the same reference characters, and the detailed descriptions thereof are omitted. Note that the directions of a double arrow A represent vehicle width directions of the electrically powered vehicle 10, the directions of a double arrow B represent vehicle length directions, and the directions of a double arrow C represent vehicle height directions.

Figure 2:
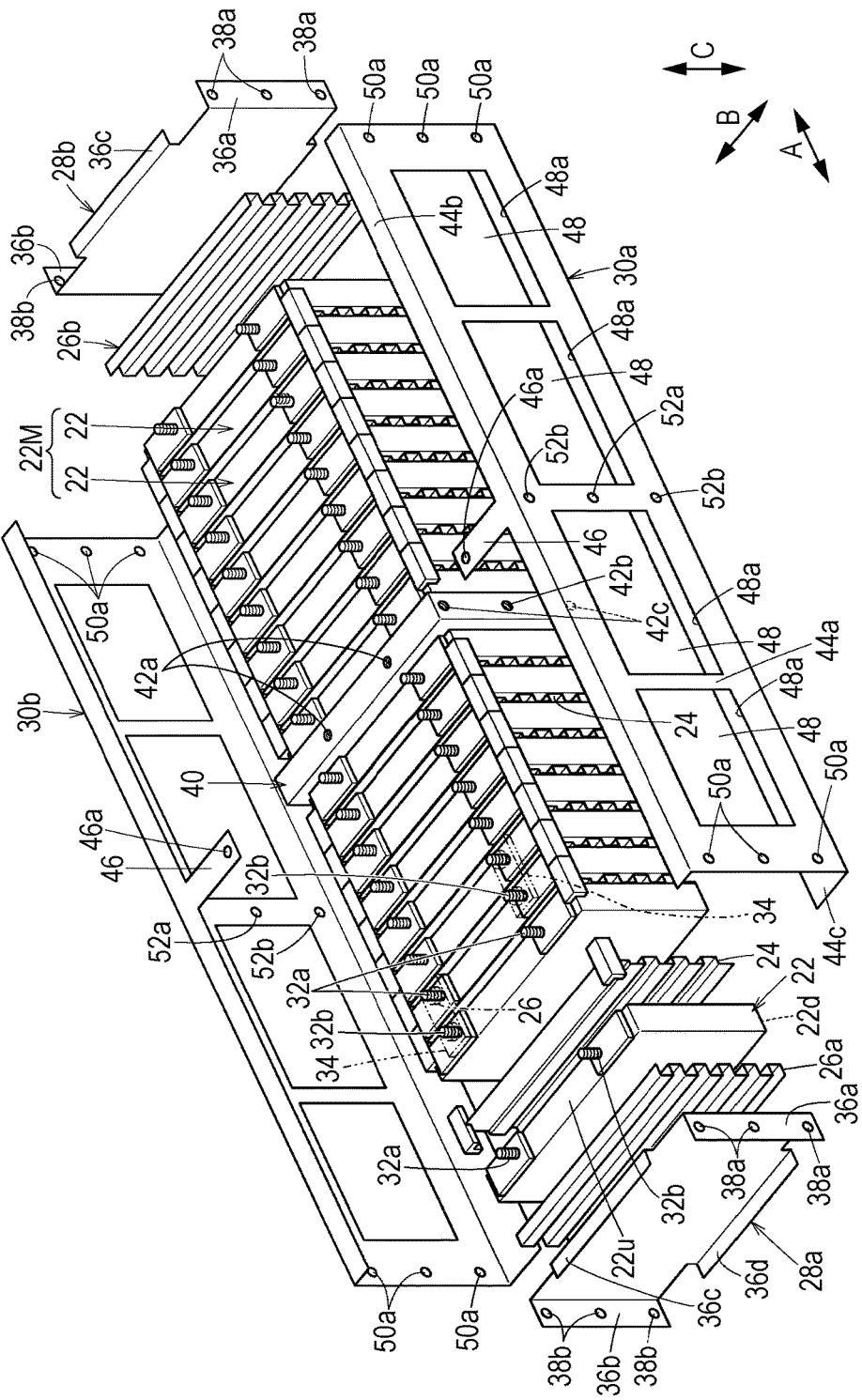
FIG. 2 is an exploded perspective illustrative view of an electricity storage module incorporated in the electrically powered vehicle.

As shown in FIG. 2, the electricity storage module 20A includes a storage cell group 22M in which a plurality of storage cells (battery cells) 22 are stacked in horizontal directions (the directions of the double arrow A). The storage cells 22 have a quadrangular shape and are stacked, in an upstanding posture, alternately with electrically insulative separators (holders) 24 in the directions of the double arrow A.

Two ends of the storage cell group 22M in the stacking direction are provided with end plates 28*a* and 28*b*. End holders 26*a* and 26*b* that have a thermally insulating function and an electrically insulating function (which may be the separators 24) are interposed between the ends of the storage cell group 22M and the end plates 28*a* and 28*b*. The end plates 28*a* and 28*b* are interconnected by two restraining bands 30*a* and 30*b* that lie on two sides of the storage cell group 22M in the directions of the double arrow B and extend in the directions of the double arrow A so that the end plates 28*a* and 28*b* hold the storage cell group 22M by fastening the storage cell group 22M in the directions of the double arrow A.

Storage cells 22 are made up of lithium ion batteries and have a quadrangular shape, for example, a rectangular (or square) shape. A first end surface 22*u* of each storage cell 22 that is an upper surface thereof is provided with a positive-pole (or negative-pole) electrode terminal 32*a* and a negative-pole (or positive-pole) electrode terminal 32*b*. Each storage cell 22 has a second end surface 22*d* that is a lower surface opposite to the first end surface 22*u*.

Of two adjacent storage cells 22, the electrode terminal 32*a* of a storage cell 22 and the electrode terminal 32*b* of the other storage cell 22 are electrically connected by a bus bar 34. The bus bar 34 is formed unitarily by pressing a plate of an electroconductive metal, for example, copper, or casting an electroconductive member.

Figure 3:
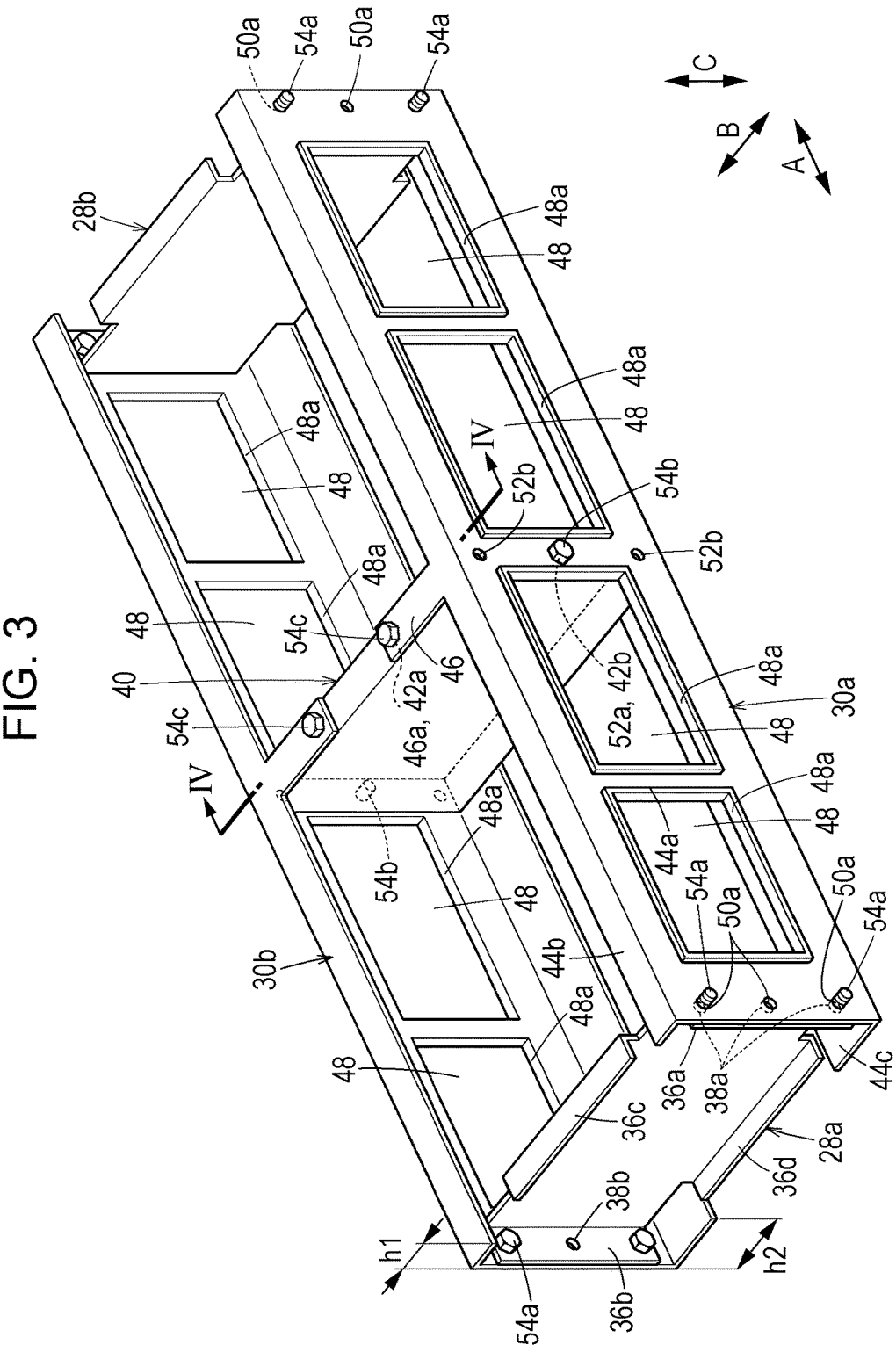
FIG. 3 is a perspective illustrative view of restraining bands, end plates, and an intermediate plate that constitute the electricity storage module shown in FIG. 2.

As shown in FIGS. 2 and 3, the end plate 28*a* is formed as a substantially flat plate and has, at two opposite ends in the horizontal directions (directions of the double arrow B), flange portions 36*a* and 36*b* that are bent outward in the stacking direction, that is, bent away from the storage cell group 22M. Two opposite ends of the end plate 28*a* in the direction of gravity (directions of the double arrow C) have flange portions 36*c* and 36*d* that are bent outward in the stacking direction.

The flange portion 36*a* of the end plate 28*a* has a plurality of, for example, three, hole portions 38*a* that are aligned in the directions of the double arrow C. The flange portion 36*b* has a plurality of, for example, three, hole portions 38*b* that are aligned in the directions of the double arrow C. Incidentally, the end plate 28*b* is formed in the same manner as the end plate 28*a*, and the same component elements thereof are denoted by the same reference characters, and the detailed descriptions thereof are omitted.

At least one intermediate plate 40 is disposed at an internal position in the storage cell group 22M in the stacking direction of the storage cell group 22M. In the first embodiment, one intermediate plate 40 is disposed at or near a center of the storage cell group 22M in the stacking direction. Incidentally, for example, two intermediate plates 40 may be disposed at two positions within the storage cell group 22M in the stacking direction in order to divide the storage cell group 22M into three sections. Although the intermediate plate 40 in this embodiment is made of a metal plate, the intermediate plate may be formed of a resin member or a member combining a resin member and a metal member.

As shown in FIG. 2, the intermediate plate 40 has a shape similar to the shape of the storage cells 22 and an upper surface of the intermediate plate 40 has two screw holes 42*a*. Two opposite side surfaces of the intermediate plate 40 each have a screw hole 42*b* and a screw hole 42*c* above and another screw hole 42*c* below the screw hole 42*b*.

Figure 4:
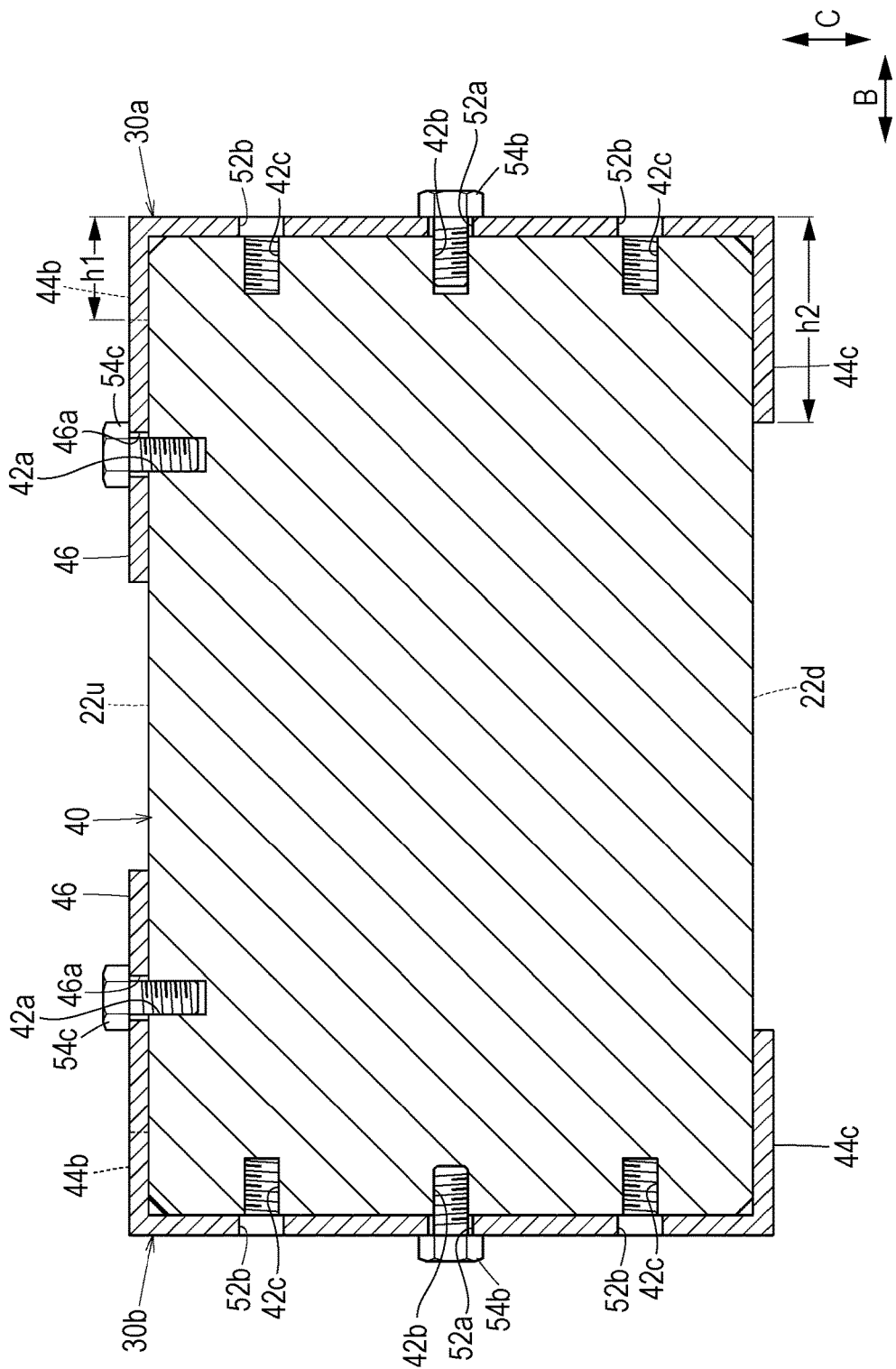
FIG. 4 is a sectional view taken on line IV-IV in FIG. 3.

As shown in FIGS. 2 to 4, the restraining band 30*a* is formed of a plate (metal plate) that has a laterally elongated shape. The restraining band 30*a* has a squared U-shaped sectional shape in a front view from the stacking direction of the storage cell group 22M (directions of the double arrow A). The restraining band 30*a* has a flat surface 44*a* that extends in the stacking direction in parallel with a side surface of the storage cell group 22M. Two opposite ends of the flat surface 44a in a short-dimension direction (directions of the double arrow C) are provided with a first bent portion 44b and a second bent portion 44c that extend to a storage cell group 22M side so as to follow the shapes of upper and lower corner portions of the storage cell group 22M.

The first bent portion 44b lies along the first end surfaces 22u of the storage cells 22 while the second bent portion 44c lies along the second end surfaces 22d of the storage cells 22. A width h1 of the first bent portion 44b is shorter (narrower) than a width h2 of the second bent portion 44c (see FIGS. 3 and 4).

The first bent portion44b has, at or near its center in the stacking direction, a projected portion 46 that is projected inward therefrom along the upper surface of the intermediate plate 40. The projected portion 46 has a hole portion 46a coaxially with a corresponding one of the screw holes 42a of the intermediate plate 40.

The flat surface 44a, according to need, is provided with opening portions 48 for, for example, reducing weight or introducing a coolant for cooling the storage cells 22. An edge portion of each opening portion 48 is provided with a bar ring 48a. An end of the flat surface 44a in the stacking direction is provided with three vertically aligned screw holes 50a that are coaxial with the hole portions 38a formed in the flange portion 36a of the end plate 28a. The other end of the flat surface 44a in the stacking direction is provided with three vertically aligned screw holes 50a that are coaxial with the hole portions 38a formed in the flange portion 36a of the end plate 28b.

The flat surface 44a has, at or near its center in the stacking direction, a hole portion 52a coaxial with the screw hole 42b formed in the adjacent one of the side surfaces of the intermediate plate 40 and two hole portions 52b coaxial with the two screw holes 42c of the side surface of the intermediate plate 40. Incidentally, the restraining band 30b is configured in the same manner as the restraining band 30a, and the same component elements are denoted by the same reference characters and will not be redundantly described in detail.

As shown in FIG. 3, of the three hole portions 38a formed in the flange portion 36a of each of the end plates 28a and 28b, the top and bottom holes 38a receive bolts 54a. Bolts 54a are screwed to the top and bottom screw holes 50a of the three screw holes 50a formed in each of the two opposite end portions of the restraining band 30a in the stacking direction.

Likewise, of the three hole portions 38b formed in the flange portion 36b of each of the end plates 28a and 28b, the top and bottom hole portions 38b receive bolts 54a. Bolts 54a are screwed to the top and bottom screw holes 50a of the three screw holes 50a formed in each of the two opposite end portions of the restraining band 30b in the stacking direction.

Bolts 54b are inserted through the hole portions 52a of the restraining bands 30a and 30b and are screwed to the screw holes 42b formed in the two side surface of the intermediate plate 40. Bolts 54c are inserted through the hole portions 46a of the projected portions 46 projected from the first bent portions 44b of the restraining bands 30a and 30b. The bolts 54c are screwed to the screw holes 42a of the intermediate plate 40.

Figure 5:
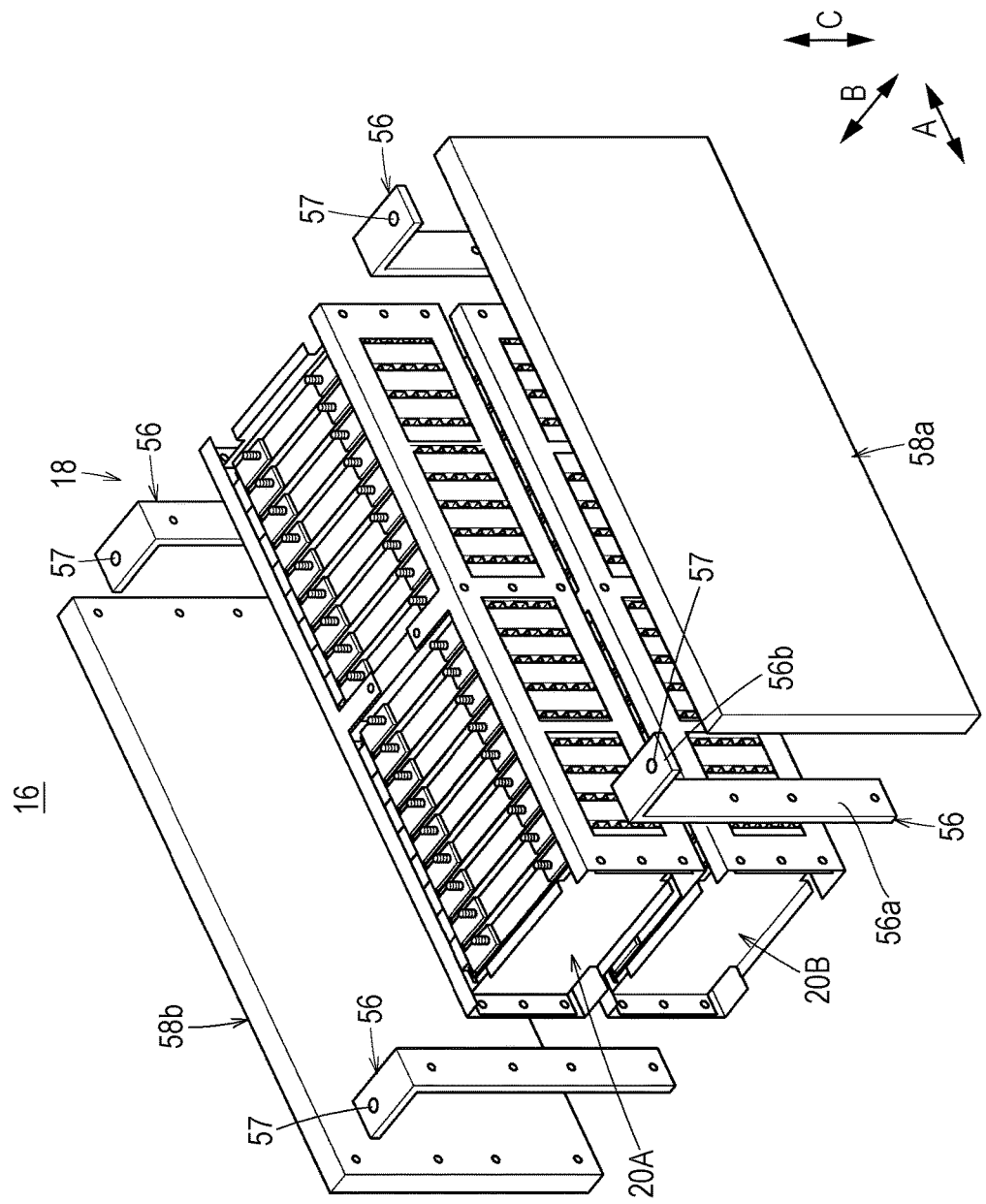
FIG. 5 is a partial perspective illustrative view of a battery pack that includes the electricity storage module.

As shown in FIG. 5, the electricity storage module 20A and the electricity storage module 20B are interconnected and disposed in a piggyback fashion. A first duct member 58a is fixed to one of two opposite side portions of the electricity storage modules 20A and 20B, via two brackets 56 that constitute the mounting structure 18. A second duct member 58b is fixed to the other side portion of the electricity storage modules 20A and 20B, via another two brackets 56 that constitute the mounting structure 18.

Each bracket 56 has a substantially L-shaped sectional shape and has an elongated fixture portion 56a that is screwed to the first duct member 58a or the second duct member 58b and a short connection portion 56b that is bent from an end portion of the fixture portion 56a to an angle of about 90 degrees. The connection portion 56b is provided with a hole portion 57.

As shown in FIG. 1, the cross-members 14a and 14b are each provided with screw holes 59. Each bracket 56 is fixed to the cross-member 14a or the cross-member 14b by a bolt 54d inserted through the hole portion 57 and screwed to the screw hole 59. In the battery pack 16, the electricity storage module 20A and the electricity storage module 20B are disposed in a piggyback fashion (in the directions of the double arrow C) and fixed to the cross-members 14a and 14b.

The first duct member 58a and the second duct member 58b are, for example, cooling ducts. The first and second duct members 58a and 58b are fixed via the hole portions 52b formed in the restraining bands 30a and 30b of the electricity storage modules 20A and 20B, bolts (not shown) inserted into the screw holes 42c formed in the intermediate plates 40, etc. The first duct members 58a and 58b or the brackets 56 are provided with fixture devices that fix electricity distribution component parts (not shown) and control-system component parts (not shown), for example, bolts, nuts, etc.

In the electricity storage module 20A constructed as described above, the two restraining bands 30a and 30b are connected to the two end plates 28a and 28b so as to restrain the storage cell group 22M. The two restraining bands 30a and 30b are connected, at their first bent portions 44b (more specifically, the projected portions 46a) extending toward each other, to the intermediate plate 40 disposed at an internal position in the storage cell group 22M in the stacking direction.

In the first embodiment, the intermediate plate 40 is disposed at or near the center of the storage cell group 22M in the stacking direction, substantially dividing the storage cell group 22M into two halves. The projected portion 46 projected from a central or approximately central portion of the first bent portion 44b of each restraining band 30a, 30b in the stacking direction is fixed to the intermediate plate 40 by a bolt 54c inserted through the hole portion 46a and screwed to the screw hole 42a (see FIG. 3). Incidentally, although in this embodiment, the first bent portions 44b and the intermediate plates 40 are fixed by screwing, this is not restrictive but the first bent portions 44b and the intermediate plates 40 may also be fixed by, for example, welding.

Therefore, since substantially central portions of the two restraining bands 30a and 30b in the stacking direction are fixed to the intermediate plate 40, the restraining bands 30a and 30b improve in the rigidity in directions that intersect the stacking direction. Therefore, the two restraining bands 30a and 30b, despite being thin-walled and light-weight, achieve advantages of certainly restraining the stacked storage cells 22 and favorably inhibiting deformation of the restraining bands 30a and 30b themselves.

Furthermore, since the two restraining bands 30a and 30b receive load, the load can be divided. Therefore, the two restraining bands 30a and 30b considerably increase the bending rigidity.

Furthermore, in each of the two restraining bands 30a and 30b, the first bend portion 44b that has a relatively short width h1 is disposed on the first end surfaces 22u of the storage cells 22 on which the electrode terminals 32a and 32b are provided, and the first bent portion 44b is fixed to the intermediate plate 40. Therefore, deformation of the narrow first bent portion 44b can be inhibited and, at the same time, it is possible to effectively reduce the width h2 of the second bent portion 44c at the second end surface 22d side.

Furthermore, since the rigidity of the two restraining bands 30a and 30b can be enhanced, the battery pack 16 can be fixed to the two cross-members 14a and 14b that constitute the vehicle body frame 12, by using only the brackets 56, as shown in FIGS. 1 and 5. Therefore, the mounting structure 18 can be advantageously simplified and made compact to a remarkable degree.

Furthermore, the first duct member 58a and the second duct member 58b are fixed directly to the electricity storage modules 20A and 20B via the brackets 56. Therefore, dedicated brackets for fixing ducts become unnecessary, thus making it easy to simply the construction and reduce costs.

Furthermore, the first and second duct members 58a and 58b or the brackets 56 can be provided with fixture devices that fix electricity distribution component parts (not shown) and control-system component parts (not shown). Therefore, the need for brackets for fixing various component parts can be advantageously eliminated.

Incidentally, although in the first embodiment, the electricity storage modules 20A and 20B are integrally supported by the two brackets 56 on each of the two sides, this arrangement is not restrictive. For example, the electricity storage modules 20A and 20B may be supported individually by separate brackets (that substantially correspond to the divided halves of the brackets 56).

Figure 6:
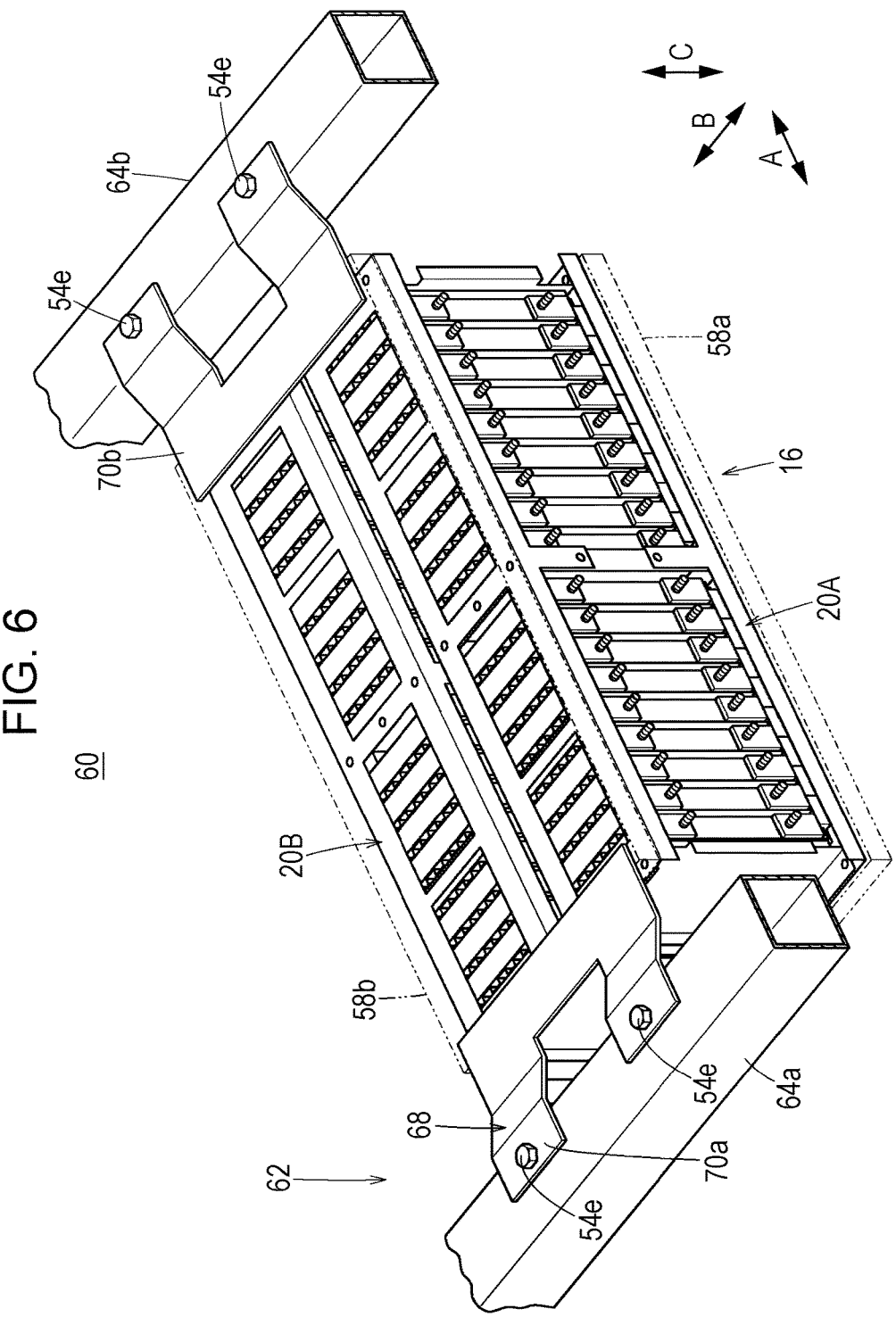
FIG. 6 is a perspective illustrative view of portions of an electrically powered vehicle according to a second embodiment of the present disclosure.

FIG. 6 is a perspective illustrative view of portions of an electrically powered vehicle (e.g., a hybrid vehicle or an EV) 60 according to a second embodiment of the present disclosure. The same component elements as those of the electrically powered vehicle 10 according to the first embodiment are denoted by the same reference characters, and the detailed descriptions thereof are omitted. With regard to the third and further embodiments described below, too, the same component elements as those described above are likewise handled, and the detailed descriptions thereof are omitted.

A battery pack 16 is mounted, via a mounting structure 68, on two side members 64a and 64b that constitute a vehicle body frame 62 of the electrically powered vehicle 60. The mounting structure 68 includes brackets 70a and 70b that are fixed to one of two side portions of electricity storage modules 20A and 20B and that are located on two opposite ends of the side portion in the directions of the double arrow A.

The brackets 70a and 70b are fixed to the side members 64a and 64b via, for example, bolts 54e. In the battery pack 16, an electricity storage module 20A and an electricity storage module 20B are arranged in a horizontal direction (directions of the double arrow B) and are fixed to the side members 64a and 64b. The electricity storage modules 20A and 20B are set in a posture (horizontal posture) obtained by a 90-degree turn from the mounting posture (vertical posture) of those in the first embodiment.

The second embodiment constructed in this manner achieves substantially the same advantageous effects as the first embodiment.

Figure 7:
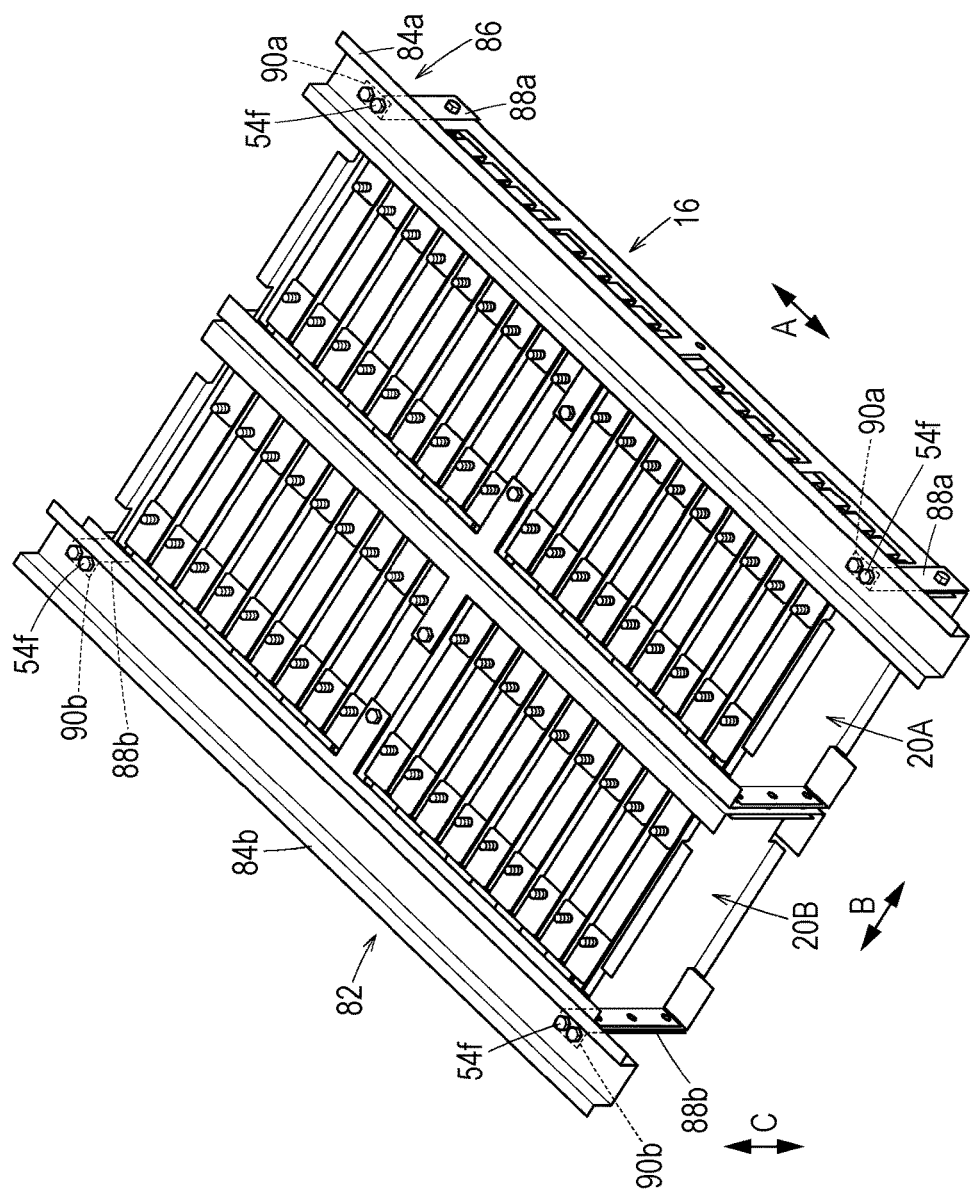
FIG. 7 is a perspective illustrative view of portions of an electrically powered vehicle according to a third embodiment of the present disclosure.

FIG. 7 is a perspective illustrative view of portions of an electrically powered vehicle (e.g., a hybrid vehicle or an EV) 80 according to a third embodiment of the present disclosure.

A battery pack 16 is mounted, via a mounting structure 86, on two cross-members 84a and 84b that constitute a vehicle body frame 82 of the electrically powered vehicle 80. As shown in FIG. 7, electricity storage modules 20a and 20B of the battery pack 16 are set in a flat arrangement in which the long sides of the substantially rectangular storage cells of the electricity storage modules 20a and the long sides of the substantially rectangular storage cells of the electricity storage modules 20b are aligned in horizontal directions indicated by a double arrow B and the short sides of the storage cells of the two electricity storage modules 20A and 20B face each other. The mounting structure 86 includes brackets 88a positioned at and fixed to two opposite ends of the electricity storage module 20A in the directions of a double arrow A and brackets 88b positioned at and fixed to two opposite ends of the electricity storage module 20B in the directions of the double arrow A.

The brackets 88a and 88b each have a substantially L-shaped sectional shape and have an upper connection portion 90a or 90b that extends horizontally and that is fixed to the cross member 84a or 84b via two bolts 54f.

The thus constructed third embodiment achieves substantially the same advantageous effects as the foregoing first and second embodiments.

Figure 8:
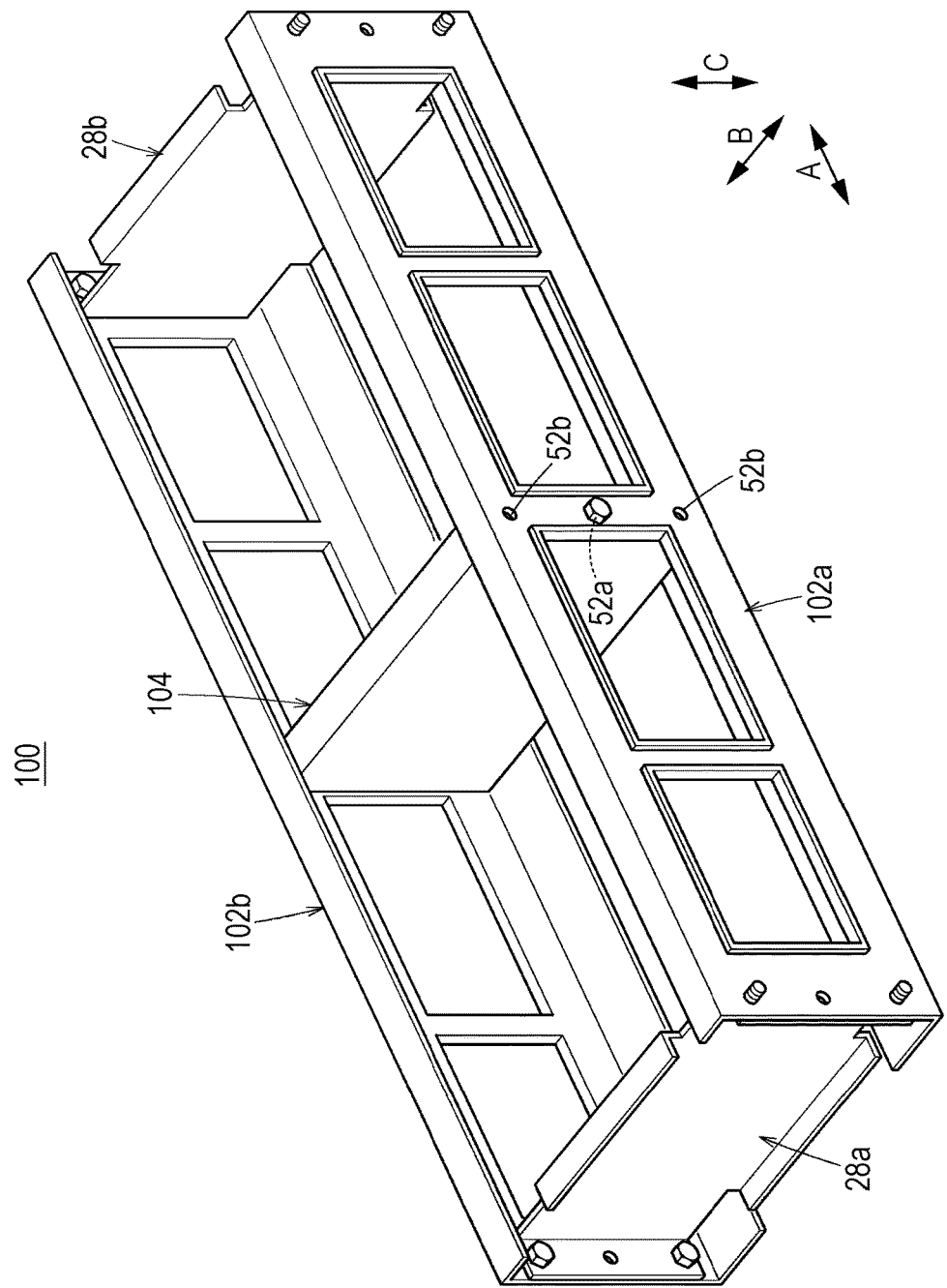
FIG. 8 is a perspective illustrative view of restraining bands, end plates, and an intermediate plate that constitute an electrically powered vehicle according to a fourth embodiment of the present disclosure.

FIG. 8 is a perspective illustrative view of restraining bands 102a and 102b, end plates 28a and 28b, and an intermediate plate 104 that constitute an electrically powered vehicle (e.g., a hybrid vehicle or an EV) 100 according to a fourth embodiment of the present disclosure. The intermediate plate 104 is made up of a metal plate or a resin plate with insert nuts provided therein.

The restraining bands 102a and 102b do not have projected portions that correspond to the projected portions 46 provided in the first embodiment. Each of the restraining bands 102a and 102b has hole portions 52b at or near a center of the restraining band in a length direction thereof (and near the bent portions). Bolts (not shown) are inserted through the hole portions 52b and screwed to the inner nuts (not shown) of the intermediate plate 104.

The thus constructed fourth embodiment achieves substantially the advantageous effects as the first embodiment. Note that the fourth embodiment is also applicable to the second and third embodiments.

An electricity storage module according to the present disclosure includes a storage cell group in which a plurality of quadrangular storage cells are stacked and two end plates provided at two opposite ends of the storage cell group in a stacking direction of the storage cells. Two restraining bands extend along mutually parallel side surfaces of the storage cell group and are connected to the two end plates and restrain the storage cell group.

Each of the two restraining bands has a flat surface that extends parallel to the side surfaces of the storage cell group and bent portions that are bent from two opposite ends of the flat surface in a short-dimension direction and that extend in such a direction that the bent portions of one of the two restraining bands and the bent portions of the other one of the two restraining bands extend toward each other following shapes of corner portions of the storage cell group. At least one intermediate plate is disposed at an internal position in the storage cell group in the stacking direction. Of the two restraining bands, the bent portions that extend toward each other or portions near the bent portions are connected to the intermediate plate.

The quadrangular storage cells may each have a first end surface on which an electrode terminal is provided and a second end surface opposite to the first end surface. The bent portions of each of the two restraining bands may be a first bent portion that lies along the first end surfaces of the storage cells and a second bent portion that lies along the second end surfaces of the storage cells. Furthermore, the first bent portion of each restraining band may be narrower in width than the second bent portion, and may be connected to the intermediate plate.

Furthermore, the present disclosure also relates to an electrically powered vehicle in which an electricity storage module is mounted. This electrically powered vehicle includes the electricity storage module described above and a vehicle body frame to which the two restraining bands are fixed via a bracket.

According to the present disclosure, the bent portions of the two restraining bands extend toward each other and are connected to the intermediate plate that is disposed at an internal position in the storage cell group in the stacking direction. For example, the intermediate plate is disposed at or near a center of the storage cell group in the stacking direction and substantially divides the storage cell group into two halves. Therefore, the restraining bands are fixed to the intermediate plate at their centers in the stacking direction or vicinities of the centers, so that the rigidity of the restraining bands in directions that intersect the stacking direction improves.

Therefore, the plurality of stacked storage cells can be certainly restrained by using the thin-walled and lightweight restraining bands, and deformation of the restraining bands can be suitably inhibited. Furthermore, the foregoing construction eliminates the need to employ a separate highly rigid frame in order to support the two opposite ends and a central or approximately central portion of the electricity storage module, making it possible to check increases in the number of component parts and the weight of a whole electricity storage apparatus that includes the electricity storage module.

Obviously, numerous modifications and variations of the present invention are possible in light of the above teachings. It is therefore to be understood that within the scope of the appended claims, the invention may be practiced otherwise than as specifically described herein.

What is claimed is:

1. An electricity storage module comprising:
    a storage cell group in which a plurality of quadrangular storage cells are stacked;
    two end plates provided at two opposite ends of the storage cell group in a stacking direction of the storage cells;
    two restraining bands that extend along mutually parallel side surfaces of the storage cell group and that are connected to the two end plates and restrain the storage cell group, each of the two restraining bands having a flat surface that extends parallel to the side surfaces of the storage cell group and bent portions that are bent from two opposite ends of the flat surface in a short-dimension direction and that extend in such a direction that the bent portions of one of the two restraining bands and the bent portions of the other one of the two restraining bands extend toward each other following shapes of corner portions of the storage cell group; and
    at least one intermediate plate disposed at an internal position in the storage cell group in the stacking direction,
    wherein, of the two restraining bands, the bent portions that extend toward each other or portions near the bent portions are connected to the intermediate plate, and
    wherein the bent portions of each of the two restraining bands are a first bent portion and a second bent portion, and the first bent portion of each restraining band is narrower in width than the second bent portion.

2. The electricity storage module according to claim 1, wherein:
    the quadrangular storage cells each have a first end surface on which an electrode terminal is provided and a second end surface opposite to the first end surface; and
    the first bent portion lies along the first end surfaces of the storage cells and the second bent portion lies along the second end surfaces of the storage cells, and the first bent portion of each restraining band is connected to the intermediate plate.

3. An electrically powered vehicle comprising:
    the electricity storage module according to claim 1; and
    a vehicle body frame to which the two restraining bands are fixed via a bracket.

4. The electricity storage module according to claim 1, wherein:
    the first bent portion of each restraining band is connected to the intermediate plate.

5. An electricity storage module comprising:
    a storage cell group comprising:
        quadrangular storage cells stacked in a stacking direction;
        a first end and a second end opposite to the first end in the stacking direction;
        first, second, third, and fourth corner portions extending along the stacking direction;
        a first side surface provided between the first and second ends and between the first and second corner portions and extending along the stacking direction;
        a second side surface provided between the first and second ends and between the third and fourth corner portions and extending along the stacking direction, the first and second side surfaces facing each other;
    first and second end plates provided at the first and second ends of the storage cell group, respectively;
    a first restraining band provided to face the first side surface of the storage cell group and connected to the first and second end plates to restrain the storage cell group, the first restraining band comprising:
        a first flat surface having a first surface end and a second surface end opposite to the first surface end in a short-dimension direction of the first flat surface and facing the first side surface of the storage cell group;
        a first bent portion bent from the first surface end of the first flat surface; and
        a second bent portion bent from the second surface end of the first flat surface;
    a second restraining band provided to face the second side surface of the storage cell group and connected to the first and second end plates to restrain the storage cell group, the second restraining band comprising:
        a second flat surface having a third surface end and a fourth surface end opposite to the third surface end in the short-dimension direction and facing the second side surface of the storage cell group;

a third bent portion bent from the third surface end of the second flat surface, the first bent portion of the first restraining band and the third bent portion extending toward each other along a shape of the first corner portion and a shape of the third corner portion of the storage cell group, respectively; and a fourth bent portion bent from the fourth surface end of the second flat surface, the second bent portion of the first restraining band and the fourth bent portion extending toward each other along a shape of the second corner portion and a shape of the fourth corner portion of the storage cell group, respectively; and at least one intermediate plate disposed at an internal position in the storage cell group in the stacking direction, the first and third bent portions or portions in vicinities of the first and third bent portions being connected to the at least one intermediate plate, wherein the first and third bent portions are narrower in width than the second and fourth bent portions.

6. The electricity storage module according to claim 5, wherein the quadrangular storage cells each have a first end surface on which an electrode terminal is provided and a second end surface opposite to the first end surface, wherein the first bent portion of the first restraining band and the third bent portion of the second restraining band lie along the first end surface of each of the quadrangular storage cells, wherein the second bent portion of the first restraining band and the fourth bent portion of the second restraining band lie along the second end surface of each of the quadrangular storage cells, and wherein the first and third bent portions are connected to the at least one intermediate plate.

7. An electrically powered vehicle comprising:

the electricity storage module according to claim 5; and a vehicle body frame to which the first and second restraining bands are fixed via a bracket.

8. The electricity storage module according to claim 5, wherein the at least one intermediate plate is disposed at or in a vicinity of a center of the storage cell group in the stacking direction.

9. The electricity storage module according to claim 5, wherein the at least one intermediate plate has a shape similar to a shape of one of the quadrangular storage cells.

10. The electricity storage module according to claim 5, wherein the first bent portion and the third bent portion have a first projected portion projected from the first bent portion and a second projected portion projected from the third bent portion, respectively, wherein the first and second projected portions extend toward each other along a surface of the at least one intermediate plate, and wherein the first and second projected portions are fixed to the at least one intermediate plate.

11. The electricity storage module according to claim 5, wherein the first flat surface of the first restraining band and the second flat surface of the second restraining band have a first opening and a second opening, respectively.

12. The electricity storage module according to claim 5, wherein the first and third bent portions are connected to the at least one intermediate plate.

* * * * *